(12) United States Patent
Dusio

(10) Patent No.: US 7,325,741 B2
(45) Date of Patent: Feb. 5, 2008

(54) ENHANCED SYSTEM MANAGEMENT AND USER ASSISTANCE THROUGH SOFTWARE MONITORING

(75) Inventor: Joseph M. Dusio, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 148 days.

(21) Appl. No.: 10/909,924

(22) Filed: Aug. 2, 2004

(65) Prior Publication Data

US 2005/0194448 A1    Sep. 8, 2005

Related U.S. Application Data

(63) Continuation-in-part of application No. 10/623,484, filed on Jul. 18, 2003, and a continuation-in-part of application No. PCT/US03/22551, filed on Jul. 18, 2003.

(60) Provisional application No. 60/492,021, filed on Aug. 2, 2003, provisional application No. 60/396,982, filed on Jul. 18, 2002.

(51) Int. Cl.
*G06K 7/10*    (2006.01)
(52) U.S. Cl. ........................... 235/472.01; 235/462.15; 235/462.02; 235/462.03
(58) Field of Classification Search ............... 235/472.01–472.03, 462.13–462.15, 451, 235/375
See application file for complete search history.

(56) References Cited

U.S. PATENT DOCUMENTS

| | | | | |
|---|---|---|---|---|
| 4,034,194 A | * | 7/1977 | Thomas et al. | 714/31 |
| 4,916,441 A | * | 4/1990 | Gombrich | 345/169 |
| 5,313,241 A | * | 5/1994 | Seim | 396/578 |
| 5,625,669 A | * | 4/1997 | McGregor et al. | 455/418 |
| 5,933,812 A | * | 8/1999 | Meyer et al. | 705/15 |
| 6,006,100 A | * | 12/1999 | Koenck et al. | 455/466 |
| 6,149,062 A | * | 11/2000 | Danielson et al. | 235/472.01 |
| 6,378,068 B1 | * | 4/2002 | Foster et al. | 713/1 |
| 6,385,739 B1 | * | 5/2002 | Barton et al. | 714/25 |
| 6,409,086 B1 | * | 6/2002 | Pellaumail et al. | 235/462.13 |
| 6,834,259 B1 | * | 12/2004 | Markwitz et al. | 702/187 |

\* cited by examiner

*Primary Examiner*—Kimberly D. Nguyen
(74) *Attorney, Agent, or Firm*—Alan M. Koenck

(57) ABSTRACT

A data utilization installation has various components such as a management computer, a mobile computer system, an access point, a printer, and application software. The management system collects status information from the components, and evaluates whether the components necessary for a particular user e.g. of the mobile computer system, to carry out a task, are ready for use. Status information is communicated to the user based on the evaluation by the management system. The management system of the utilization installation may be located remote from the other components of the installation, and communicate via the Internet or other wide area medium, or the management system may be located locally to the user, e.g. in a branch management station, or in one of the devices to be employed by the user, including the mobile computer system that at least in part may be worn or otherwise carried by the user. In one embodiment, each of the devices may carry an indicator such as a signal light, that is controlled by the management system to communicate to the user whether or not the needed data handling components are ready for use in carrying out the task of the user.

14 Claims, 10 Drawing Sheets

Physical Connectivity for Device Management

Layered view of a network managed device

FIG. 4 - PRIOR ART

ENHANCED SYSTEM MANAGEMENT AND USER ASSISTANCE THROUGH SOFTWARE MONITORING

CROSS-REFERENCE TO RELATED APPLICATIONS

The present application is a continuation-in-part of application Ser. No. 10/623,484 filed Jul. 18, 2003 and a continuation-in-part of PCT International Application No. PCT/US2003/022551 filed 18 Jul. 2003 (and published as WO 2004/010252 on 29 Jan. 2004), both of which claim the benefit under 35 USC 119(e) of U.S. Provisional Application No. 60/396,982 filed 18 Jul. 2002. The present application also claim the benefit under 35 USC 119(e) of U.S. Provisional Application No. 60/492,021 filed Aug. 2, 2003. Each of the above-mentioned applications is hereby incorporated herein by reference in its entirety.

BACKGROUND OF THE INVENTION

Definitions
  The scope of a system or "System Scope" describes a set of "System Elements" that address automation opportunities for a finite segment of business operations. System scopes are often identified by the name of the business segment that they serve Examples of "System Scope" include
    The wireless automation of manufacturing operations
    The wireless automation of shipping operations
    The wireless automation of inventory management
  "System Elements" are that set of technological entities which include but are not limited to electronic hardware devices, application software programs and device firmware which belong to the same system scope.
  "Management Activities" include but are not limited to obtaining, analyzing and displaying status of the various elements of the system. Management activities also include the control of the system elements.
  A "System" is a set of "System Elements".
  "System Management" includes "Management Activities" on all of the "System Elements" in a "System". A typical system of the assignee of this patent application is comprised of any number access points, handheld computers, printers as well as both management and business specific application software.

System Management of Devices (FIGS. 1A, 1B, 2, 3 and 4)

Historically management application software concentrated on a specific type of device such as an access point or a printer. This type of management is called "Device Management" because if focuses upon a specific type of device. This type of software was typically created by the manufacturer of the managed device. The evolution of device management software grew to supporting multiple models of the same device type as well as the simultaneous support of different configurations of hardware, firmware and software for the device type. Device Management is illustrated in FIGS. 1A and 1B, where a device-management component 10 is shown coupled with one or more access points such as 12 and 14, and a device-management component 16 is shown coupled with a printer 18.

System Management applications encompass device management, but extend the scope of managed devices to multiple types of devices. System Management applications that support differing types of devices but do not address their membership in a system or their interaction with other system devices embody an approach coined "System Management of devices" by the assignee of this patent application. The system management of devices approach is depicted in FIG. 2.

The most significant advancement of system management is the extension of management activities from the simple scope of a device type to the "System Scope" (defined above). It is proposed that System management activities now not only look at devices individually, but strive to make them work together to the customer's advantage. Specifically the system management application must address each device's membership in a system and the interactions between the devices of that system. A diagram of a managed system is shown in FIG. 2 where the system management component 20 is shown coupled to handheld computers 21-23, access points 26,27 and a printer 28.

The class of devices which is the subject of device management is called "Managed Devices". Access points and printers are examples of managed devices as depicted in FIGS. 1A, 1B, and 2.

Managed devices are also typically capable of working in a network environment. The most common method of becoming network capable is the addition of an Ethernet network interface card (NIC). The Ethernet support in the managed device typically serves the dual purposes of passing business data as well as management data.

FIG. 3 is a schematic view of some of the common internal components of such an Ethernet enabled managed device 30. One can see that the computer's operating system 31 (i.e. Microsoft Windows or Unix) resides as a software layer hosted upon the computer hardware. We have also depicted applications 33, 34, and 35. Application 35 on the far right in FIG. 3 is not a networked application, but runs directly on the operating system 31.

The other applications such as 33 and 34 are software entities that rely upon the core TCP/IP communications stack 37. The "core" as referred to above encapsulates layers two through four of the ISO seven layer stack. As is typical with TCP/IP applications the presentation (layer six) and session (layer five) layers are implemented within the application (layer seven) itself. Using the TCP/IP stack makes the two leftmost applications 33 and 34 networked applications because they have the ability to use the TCP/IP layer 36 to communicate with other networked applications.

This technique is precisely how networked applications such as 33 and 34 move business data between the software components of a distributed networked application.

The leftmost box 37 in FIG. 3 at the application layer (layer seven) is labeled SNMP Agent. This box 37 represents an SNMP agent as defined by Internet RFCs (Requests for Comments) such as 1155, 1157, 1215 1901-1910, 2578-2980 and 2570-2576. The depiction serves the purpose of demonstrating a method by which a management computer 38 transfers management data, as distinct from business data, to and from the managed device. The SNMP agent 37 is itself a networked application. Different from most networked applications SNMP agents have visibility to other software running on the managed device. Further the SNMP agent makes this data available for review and modification to the management computer's software. FIG. 3 depicts a communication path 39 via which a request from the management computer 38 may be coupled through the managed device's hardware, operating system, TCP/IP stack and into the SNMP agent. The agent 37 then gains access to data in the managed device 30 such as variables in the TCP/IP stack 36 itself and sends the requested data back through the same path 39 to the management computer 38. In this way networked managed devices support both business data and management data over an Ethernet pathway such as indicated at 39.

A diagram of a managed system is shown in FIG. 2 where the system management component 20 is shown coupled to handheld computers 21-23, access points 26, 27 and a printer 28. Each of these managed devices is a networked device and is said to be "instrumented" due to the addition of a management agent such as SNMP agent 37 as described above in the layered view of a networked managed device 30. The significant difference in this depiction is the sophistication of the management computer's software. This management software of component 20 works with different types of managed devices and only one management station is used to manage all the managed devices.

FIG. 4 depicts an application processing system 400 which would typically reside on the application server provided with an Ethernet network interface card 40, and an instance of the remote client application 41 as would typically execute on a handheld computer.

Running in the server's operating system 42 are the layers of the TCP/IP stack labeled "MAC/LLC Layer" 43, "IP Layer" 44 and "TCP Layer" 45. These layers correspond to layers two, three, and four of the seven layer ISO stack respectively. In the example of FIG. 4, the software application 48 on the server communicates with the remote client applications at 41 via communication paths 46 and 47, through ports five thousand (5000) and five thousand and one (5001) of the TCP stack 45. These paths 46 and 47 are for the express purpose of passing business data, but do not support any management data. For this reason the software application 48 on the server is called an "Un-Instrumented Software Application".

The Importance of Managing the Business Application (FIGS. 5 and 6)

It is helpful to envision typical operational scenarios in understanding the importance of instrumenting the business application software. FIG. 5 shows a wireless handheld computer 51 that has a radio connection at 52 to an access point 53 which itself is connected to an Ethernet segment 54 upon which an application server 500 and printer 56 are also connected. Many typical scenarios use this hardware configuration. A typical use of this configuration is that a scanned bar code or other piece of information is acquired or entered at the handheld computer 51. That data is sent through the access point 53 to the application server 500 on which a business application is executing. The business application software processes the data and sends the results of that processing to the printer 56 e.g. to print an appropriate label, back to the handheld computer 51 or both. The systems of FIGS. 7, 8 and 9 may thus be used in the automation of shipping operations in a factory or warehouse, or for re-pricing operations in a retail store.

The "System management of devices" approach would add a management computer as at 60, FIG. 6, and require that the hardware devices be manageable and instrumented and would manage those devices namely, the handheld computer 61, the access point 63 and the printer 66 as indicated by dash lines 67, 68 and 69.

The importance of managing the business application software is clear when the management software providing "System management of devices" reports that the handheld computer, access point, printer and server are all alive and well, when at the same time the user of the handheld computer cannot perform the required transactions because the business application which is expected to be executing on the server is not actually executing or is in a state where it is not responding to user transactions. In either case the user of the handheld computer cannot perform business tasks with this system.

The solution is to provide a system wherein a management computer performs management of all the system elements that are important to a user in carrying out a given automated business operation. To accomplish this feat, the manageable elements of the system must also include the business application software itself.

SUMMARY OF THE INVENTION

System Management of Application Software

The "system management of devices" approach to system management, even with its new focus on the "system" instead of just devices is still limited in its ability to manage automatically because of its failure to recognize that the application software is an element of the system and should therefore be managed. (A diagram of a managed system that includes the management of the software application is shown in FIG. 7, and will be described hereafter.)

An important innovation as described herein is the addition of manageable software applications to systems. Current business application programs are not instrumented even though they are designed to work in a networked environment.

An important feature of the present invention resides in the addition of manageable software applications to wireless automation operations for business segments (examples of such operations having been given hereinabove with reference to the definition of "system scope").

Many implementations of application augmentation are possible. An extremely simple example is to have the application software support an additional TCP port on which it listens for requests and simply returns a positive indication, such as a numeric constant which signifies that the specific application is indeed active and operational. (FIG. 8, to be hereafter described, depicts an instrumented networked software application that supports its remote client applications through predetermined or well-known TCP ports, and provides an additional TCP port supporting remote management applications.)

In accordance with a preferred implementation of the present invention, a management application is enabled to send queries and commands directly to the instrumented software application. The potential data exchanges between the management application and the Instrumented software application are endless.

It is preferred that standard protocols utilizing portable communications source code be used to send management messages to the instrumented application, such as SNMP or vendor specific protocols that use the standard and portable client/server sockets programming environment. The definition of a standard but extensible minimum set of protocol messages will allow the management of multiple Instrumented software applications with a minimum of effort in the management application; for example only a single request message of each kind would be required for the various types of managed devices.

More important than the protocol used to transport messages between the instrumented application and the management computer is the meaning and application of those messages. The following table (Table I in the Detailed Description section hereof) enumerates some questions, which the management computer would pose through such a transport to the instrumented business application. The answers to these questions could be directly communicated to the management application, and made available e.g. to the affected users of the managed system. Note that the set of questions enumerated below in Table I are segmented into two classes. Firstly, "Global Questions" are questions that pertain to the entire system and its users. The second set of questions is focused on a single device or user.

Unsolicited Messages from the Business Application to the Management Software

Beyond the "query and respond" paradigm of messages between the management software and the instrumented business application, unsolicited messages from the instrumented business application are useful in the same way that SNMP traps are used.

These messages are called unsolicited because they are sent without any query message such as used with most business and management messages. The unsolicited messages may be used to inform the management application of asynchronous events such as the resource unavailability of a printer or external database server.

System Requirements Specification

Since the business application is the central component in fully manageable systems as described in this section, it is the natural location for the "understanding" of the required system elements for any user. That is to say when user "X" logs into the business application, the business application can "know" if the tasks user "X" is to perform require a printer, external database or any other component that is external to the business application itself.

The knowledge of the required resources for a given user can be sent to the management software as a specification of those things to monitor, which are critical to the user's ability to perform the required business tasks with the system. If one or more of the required system resources becomes unavailable, then the system management application may display that information on the management console. Such a display could include a list of those users that would be affected by the resource unavailability. Users of the assignee's handheld computers equipped with a system light (refer to the Dusio et al nonprovisional patent application filed Jul. 18, 2003, and incorporated herein by reference) could also be notified through the system light that a condition now exists which will keep them from being productive.

Resource unavailability information as detected by the business application software could be sent to the management software via an unsolicited message as described above. Similarly an unsolicited message could also be sent to signal the management software that a system resource has become available again.

Other embodiments, aspects, advantages and novel features of the present inventions will become apparent from the following detailed description when considered with the accompanying claims and drawings, and incorporated material.

DETAILED DESCRIPTION

FIGS. 1A, 1B, 2, 3, 4, 5 and 6 are described in the foregoing Background of the Invention section. An example of a network manager for various network devices is disclosed in U.S. Provisional Patent Application No. 60/044,000, filed Apr. 16, 1997, and in U.S. Non-provisional patent application Ser. No. 09/061,285 filed Apr. 16, 1998, both said applications being hereby incorporated herein by reference in their entirety including drawings and appendices and incorporated material. The incorporated Nonprovisional application Ser. No. 09/061,285 had the title "Network Manager Including User Defined Trap Capability," and described the technical field of the invention as follows;

> The invention (of the incorporated Non-provisional Application) "relates generally to the management of networks and more particularly to a network manager that establishes operating parameter limits within network devices, monitors network device parameters to determine whether corresponding operating parameter limits have been exceeded, selectively provides operating parameter feedback to a central location upon such events, selectively disables or modifies operation of failed devices and reports to a user when appropriate."

Figure 7:
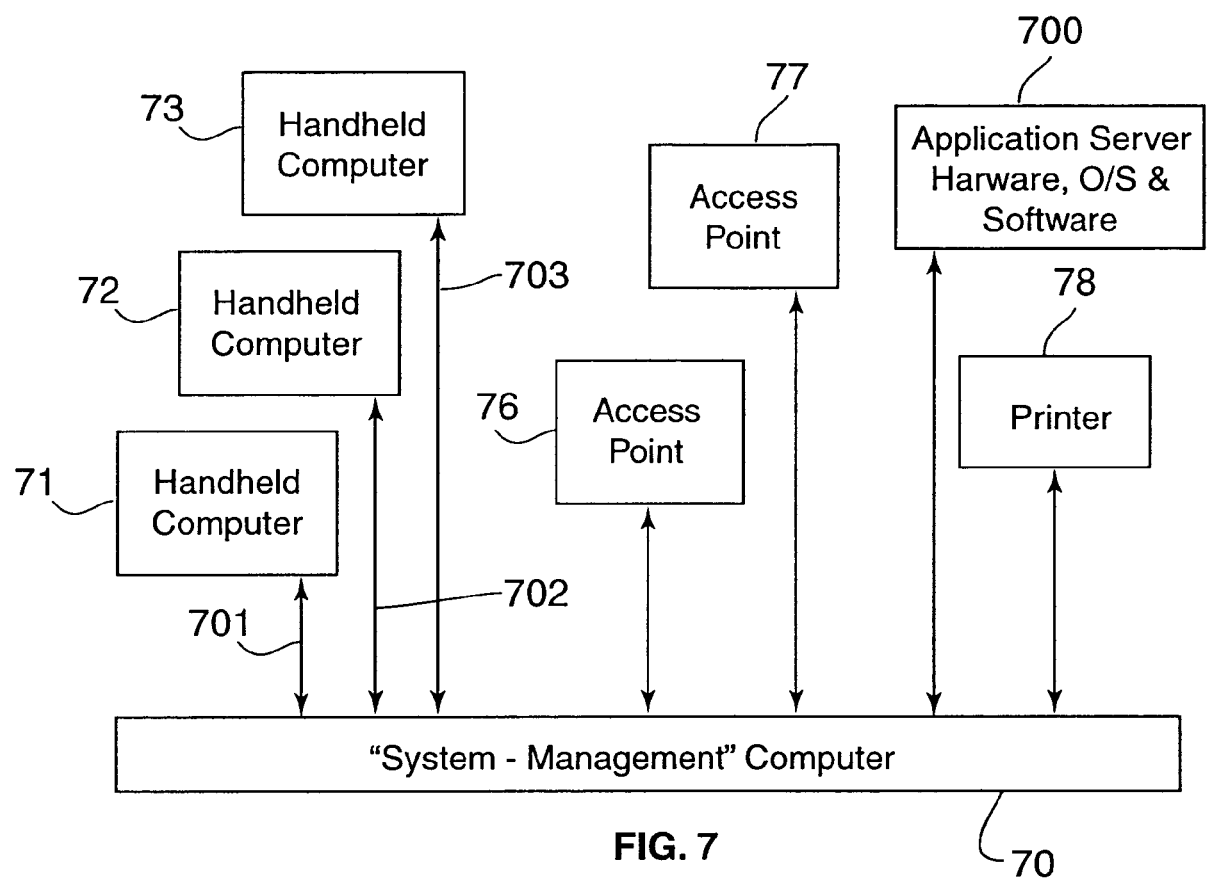
FIG. 7 is a block diagram illustrating a managed system that includes management of the software application, in accordance with the teachings of the present invention.
Figure 8:
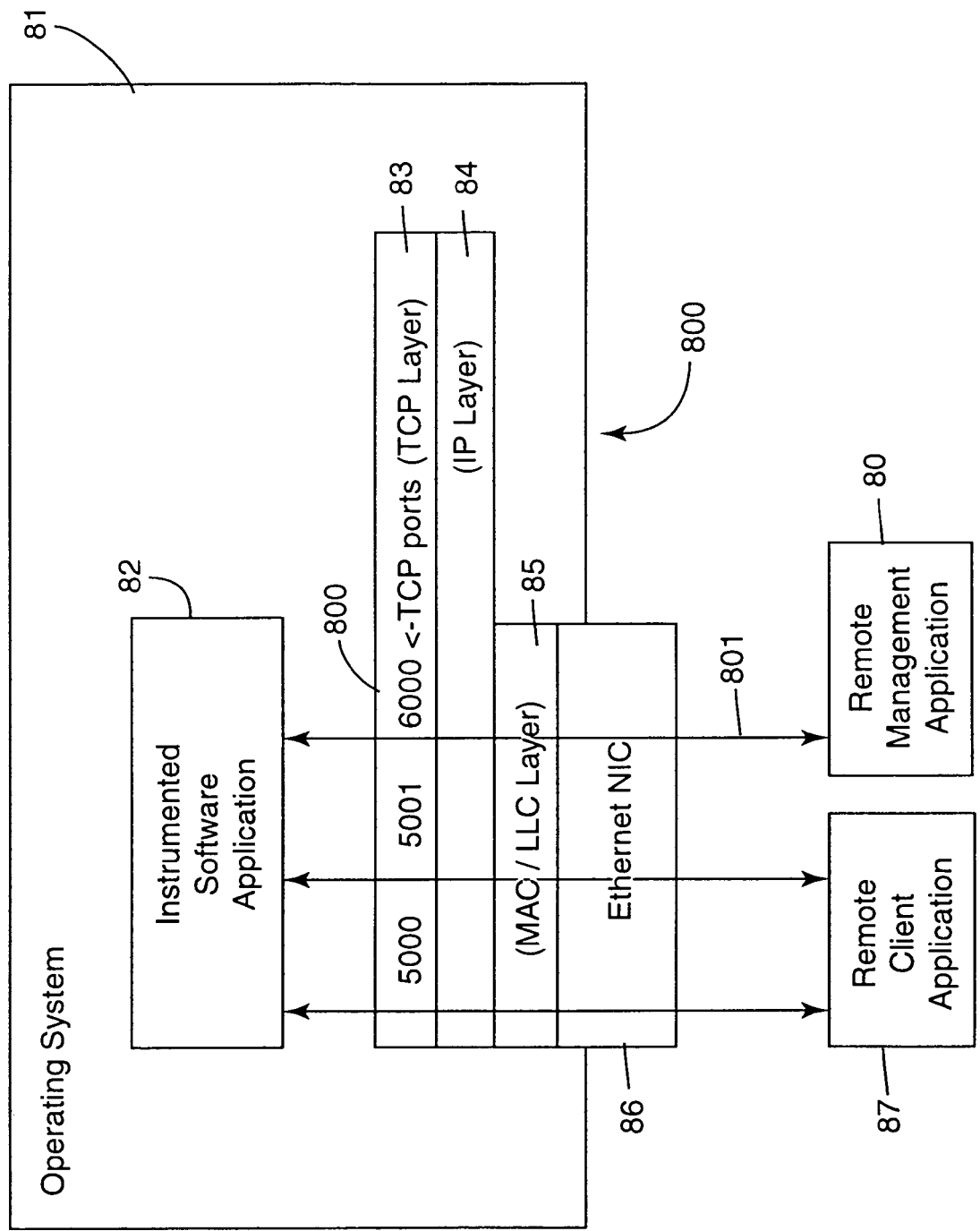
FIG. 8 is a block diagram similar to FIG. 4, but illustrating a preferred embodiment where application software is instrumented to support remote management applications.
Figure 9:
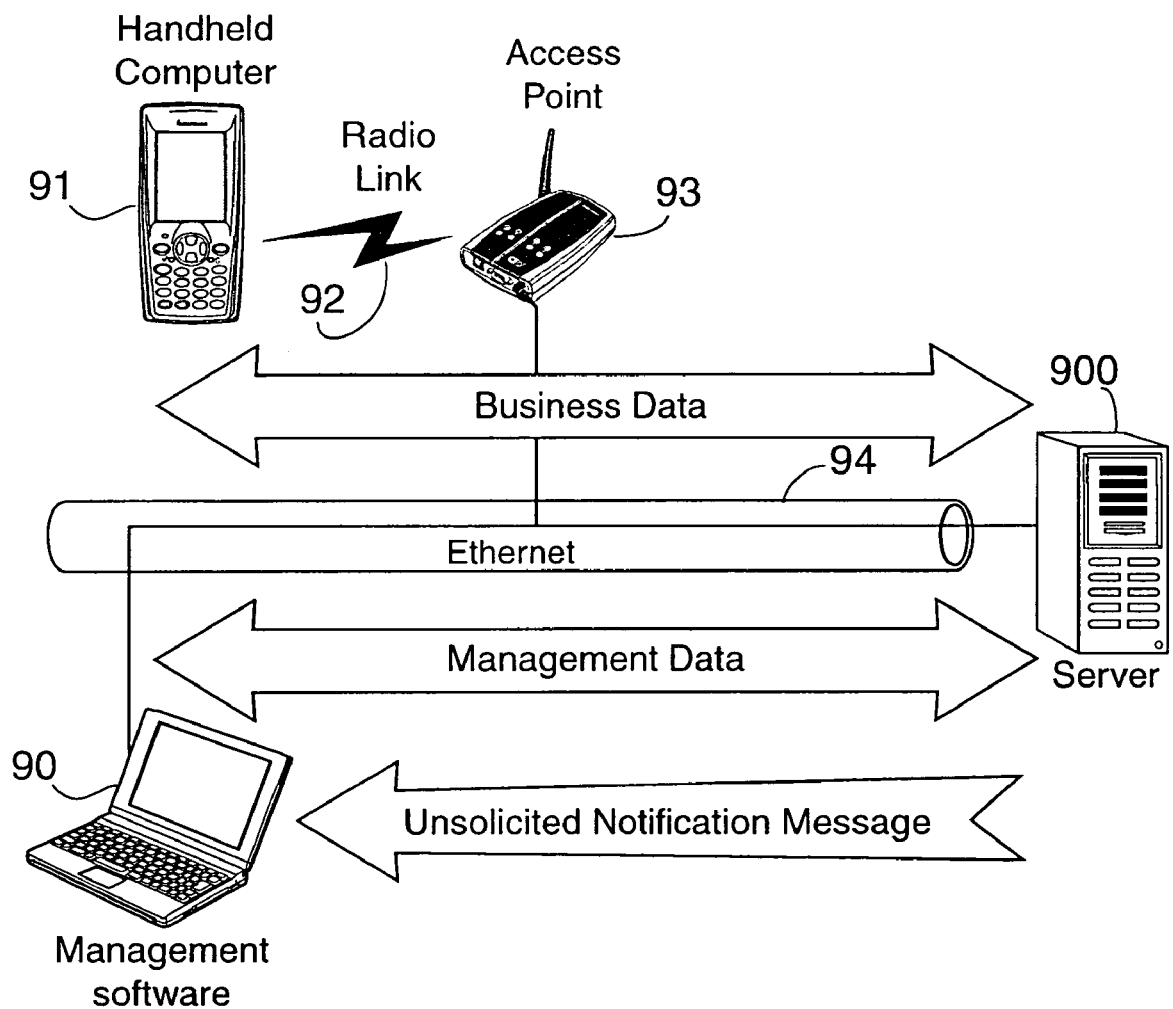
FIG. 9 is a diagrammatic illustration of a wireless automation operation of a business segment that is to facilitate the work activities of a worker by providing a handheld computer with a wireless link to a network including a server and e.g. a printer, wherein a management station is provided with software for assessing the operational status of the various elements preferably including the business software application installed in the server, and such business software application coupled with the network for communicating to the management software unsolicited notification messages e.g. concerning resources "known" to be required by a given user or users.

Description of FIGS. 7, 8 and 9

FIG. 7 shows a fully managed system that includes the management of the software application, so that a worker carrying out an automated operation (e.g. as included in the definition "system scope" in the Background of the Invention section hereof) can be essentially fully supported by the managed system. In such a system, a system management computer 70 not only communicates with handheld computers such as 71, 72, 73 (via wireless links 701, 702 and 703), access points such as 76, 77, and e.g. a printer 78, but also monitors the software of the application server 700. In this way, the system management computer 70 learns e.g. whether the software application at the server 700 is executing.

FIG. 8 illustrates a network software application where a processing system such as an application server 800 communicates with a remote management application at 80, and comprises an operating system 81, an instrumented software application program 82, a TCP layer 83, an IP layer 84, a MAC/LLC layer 85, and an Ethernet network interface car (NIC) 86. The software application 82 has two-way communication with a remote client application 87, e.g. which would typically execute on a wirelessly coupled handheld computer (such as indicated at 91 in FIG. 9. FIG. 8 indicates at 801 that a remote management application 88 may be in communication with the instrumented software application 82 (e.g. via a selected TCP port six thousand of the TCP layer 83).

With a communication link such as 801, the remote management application 80 can penetrate into the strata of software applications such as 82. In such a case, the remote management application 80 is able to determine which software applications such as 82 are running and their current operational status. The operating system 81 could be provided with a software routine for responding to an inquiry from the remote management application 80 in an automatic manner so as to indicate e.g. whether the needed software version of application 82 was loaded and operational. Such an approach provides an indication that the desired software application such as 82 is executing—e.g. properly processing communications from a given remote client application such as 87.

An extremely simple example for the system of FIG. 8, is to have the application software support an additional TCP port (arbitrarily designated six thousand in the illustration) as indicated at 802. When a request is received at port 802 from the remote management application 80, the software application 82 could automatically return to the management application 80 a positive indication, such as a numeric constant, signifying that the specific application 82 is indeed active and operational.

Figure 5:
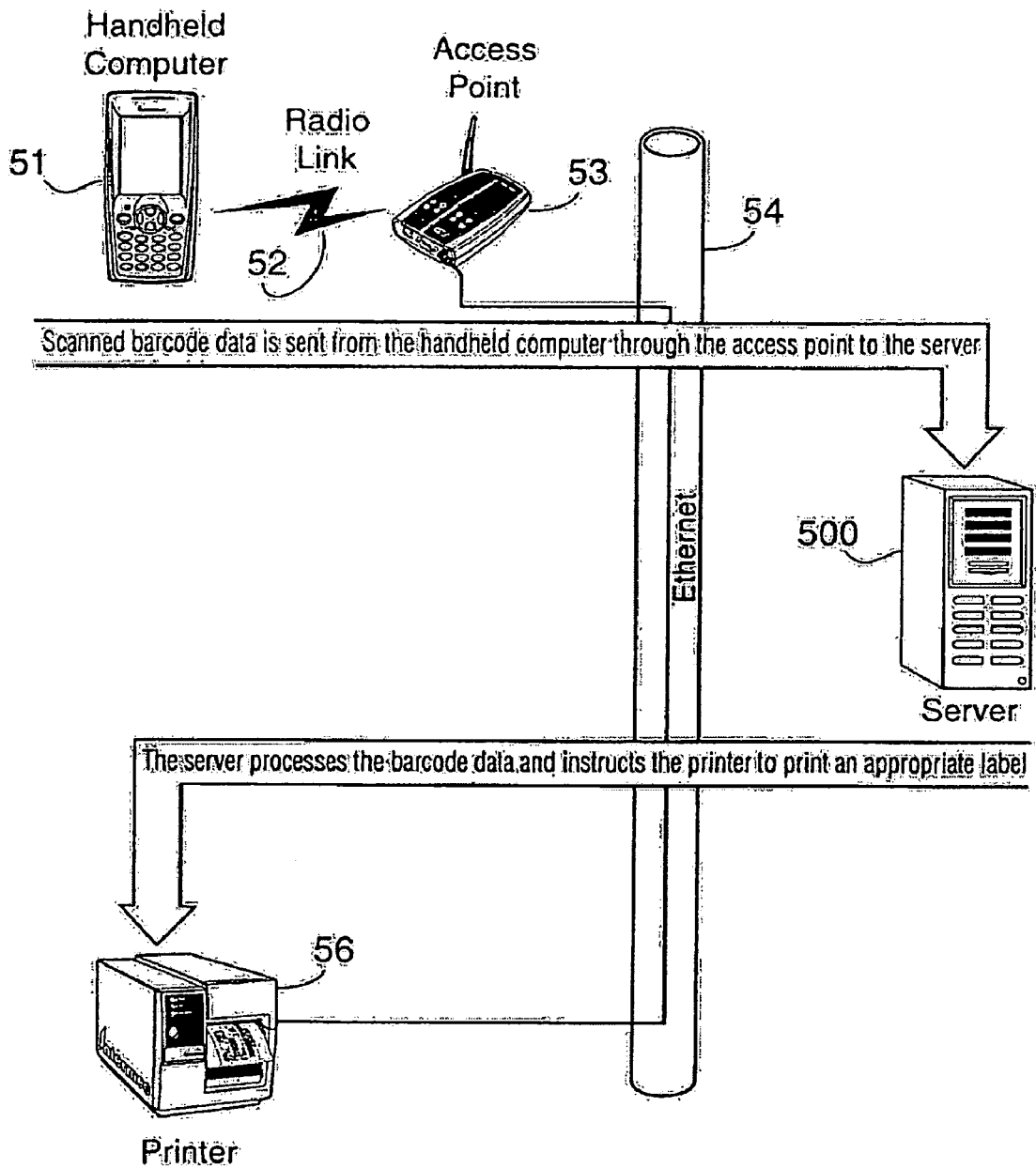
FIG. 5 is a diagrammatic illustration of a wireless automation operation of a business segment that is to facilitate the work activities of a worker by providing a handheld computer with a wireless link to a network including a server and e.g. a printer.

As explained with reference to FIGS. 5 and 6, typical operational scenarios show the importance of instrumenting the business application software such as 82 at servers such as indicated at 700, FIG. 7, and at 800, FIG. 8. Referring to FIG. 9, a management computer 90 may have communication with an instrumented software application such as 82 for servers 700 or 800, which is installed on the server 900, FIG. 9A wireless handheld computer 91 may have a radio connection 92 to an access point 93. The access point 93 itself may be connected directly or via a further wireless link to an Ethernet segment 94 upon which the application server 900 and a printer such as 56 or 66 are also connected. Many typical scenarios use this hardware configuration. A typical use of this configuration is that a scanned bar code or other piece of information is acquired or entered at the handheld computer 91. That data is sent through the access point 93 to the application server 900 on which a business application is executing. The business application software processes the data and sends the results of that processing to the printer e.g. to print an appropriate label as described with reference to FIG. 5, back to the handheld computer 91 or both. The systems of FIGS. 7, 8 and 9 may thus be used in the automation of shipping operations in a factory or warehouse, or for re-pricing operations in a retail store. Instead of or in addition to printing a label and/or a barcode label with the use of a printer, the application software such as 82 at servers 700, 800 and 900, may be coupled with an RF tag programming system so as to enter required new information on a RF tag associated with the goods or transport means therefor. Equipment such as printers and RF tag programmers may be carried with the user of the handheld computer e.g. at 71, 87 or 91.

The management computer 90 is equipped to manage the hardware devices which are manageable and instrumented, namely the handheld computer 91, the access point 93 and the printer. The importance of managing the business application software is clear when the management software of the management computer 90 reports that the handheld computer 91, access point 93, printer and server hardware are all alive and well, but at the same time the user of the handheld computer 91 cannot perform the required transactions because the business application which is expected to be executing on the server 900 is not actually executing or is in a state where it is not responding to user transactions. In either case the user of the handheld computer 91 cannot perform business tasks with the system.

The solution is to add a management computer that performs system management of essentially the entire system that is required for the user of the handheld computer 91 to perform his work operations. That is, as represented in FIGS. 7, 8 and 9, at least all the essential elements of the system are managed including the business application software itself.

FIGS. 7, 8 and 9 show the preferred direct communication of remote management applications at 70, 80 and 90 with the desired executing software component such as 82 at servers 700, 800 and 900. For these embodiments the management software at 70, 80 and 90 assesses the operational status of all system elements including the software application such as 82 at servers 700, 800 and 900. The management application can now send queries and commands to the instrumented software application. The data exchanges between the management application and the instrumented software application are endless.

It is presently preferred that standard protocols such as SNMP or vendor specific protocols that use the standard client/server sockets programming environment be used to send management messages to the instrumented application. The definition of a standard but extensible minimum set of protocol messages would allow the management of multiple Instrumented software applications with a minimum of effort in the management application since only a single kind of request message need be sent for the various types of managed elements.

More important than the protocol used to transport messages between the instrumented application and the management computer is the meaning and application of those messages. The following Table I enumerates some questions which the management computer at 70, 80 and 90 would pose through such a transport to the instrumented business application. The answers to these questions could be directly consumed by users of the management application such as 82 at servers 700, 800 and 900. Note that the set of questions enumerated below are segmented into two classes. Firstly, "Global Questions" are questions that pertain to the entire system and its users. The second set of questions is focused on a single device or user.

These messages are called unsolicited because they are sent without any query message such as is used with most business and management messages. The unsolicited messages may be used to inform the management application at 70, 80 and 90 of asynchronous events such as the resource unavailability of a printer or external database server.

As the business application is the central component in the systems described with respect to FIGS. 7, 8 and 9, it is the natural location for the "understanding" of the required system elements for any user. That is to say when user "X" logs into the business application, the business application can "know" if the tasks user "X" is to perform require a printer, external database or any other component that is external to the business application itself.

The knowledge of the required resources for a given user can be sent to the management software as a specification of those things to monitor which are critical to the user's ability to perform the required business tasks with the system. If

TABLE I

| Message number | Question |
|---|---|
| | *Global Questions* |
| 1 | Is the application alive? |
| 2 | Is module "x" of the application loaded and running? |
| 3 | Which user accounts are currently logged on? |
| 4 | What is the current count of application transactions? |
| 5 | How many users are currently logged on? |
| 6 | Over the last 30 minutes, what is the average application transaction count per user? |
| 7 | What is the current count of failed logon attempts? |
| 8 | Which user accounts have had more than "x" logon failures in "y" days? |
| 9 | Which user account has the most logon failures? (Answer to include account ID & count) |
| 10 | What is the current count of failed application transactions? |
| 11 | What is the current count of application transaction retries? |
| 12 | When was the last user logon? (Answer to include account ID & time) |
| 13 | Who was the last user attempting to logon? (Answer to include account ID, time, reason) |
| 14 | When was the last transaction? (Answer to include account ID, time) |
| 15 | When was the last user account terminated (logout or time-out) (Answer to include account ID, time & logout/timeout) |
| 16 | When was the last user session terminated by logout? (Answer to include account ID & time) |
| 17 | When was the last user session terminated by timeout? (Answer to include accounted & time) |
| | *Questions regarding a single user* |
| 18 | Is user account "x" logged on? |
| 19 | What is the count of application transactions for user "x" during the most recent session? |
| 20 | What is the count of failed logon attempts for user "x" during the most recent session? |
| 21 | What is the count of failed application transactions for user "x" during the most recent session? |
| 22 | What is the count of retried application transactions for user "x" during the most recent session? |
| 23 | When was the last logon attempt for user "x" during the most recent session? |
| 24 | When was the last application transaction for user "x" during the most recent session? |
| 25 | Was the termination of the previous session for user "x" due to log-off or timeout? |
| 26 | When was the previous session terminated for user "x"? |

Beyond the query and respond paradigm of messages between the management software at 90 and the instrumented business application at 900, unsolicited messages from the instrumented business application at 900 are useful in the same way that SNMP traps are used. The foregoing features of FIG. 9 are also applicable to FIGS. 7 and 8, and are hereby applied to the systems described with respect to these systems as well.

one or more of the required system resources becomes unavailable, then the system management application may display that information on the management console. Such a display could include a list of those users that would be affected by the resource unavailability. Users of Intermec handheld computers equipped with a system light could also be notified through the system light that a condition now exists which will keep them from being productive.

Resource unavailability as detected by the business application software such as 82 at servers 700, 800 and 900 could be sent to the management software at 70, 80 and 90 via an unsolicited message as described above. Similarly an unsolicited message could also be sent to signal the management software that a system resource has become available again.

Figure 1A:
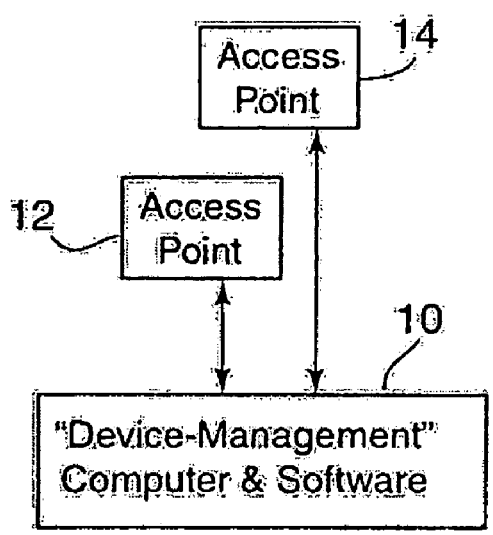
FIG. 1A is a block diagram illustrating device management of a plurality of access points, as described in the foregoing Background of the Invention section.
Figure 1B:
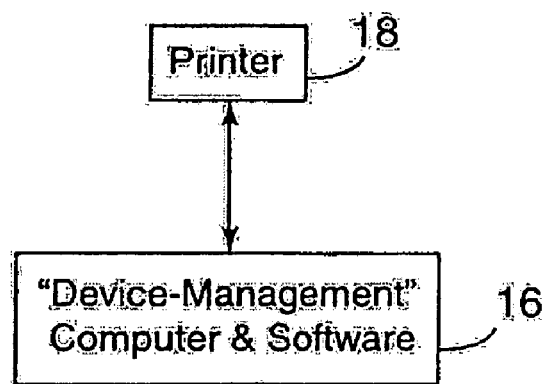
FIG. 1B is a block diagram illustrating device management of a printer, as described in the Background of the Invention section.
Figure 2:
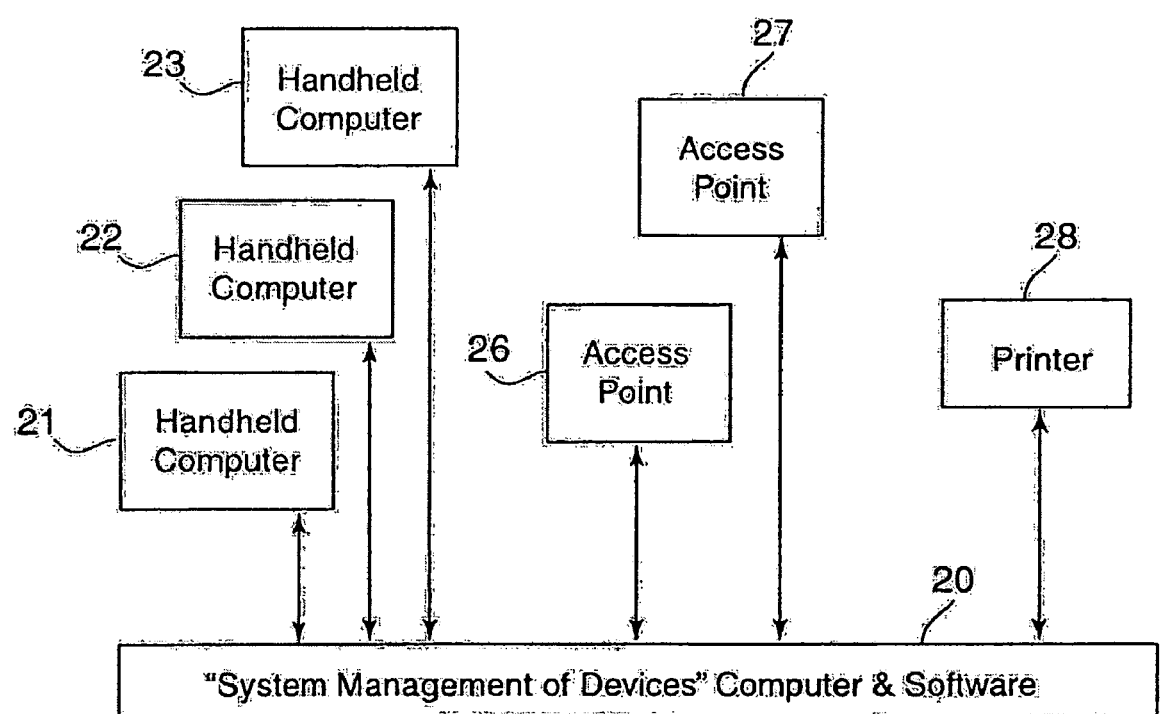
FIG. 2 is a block diagram illustrating system management of multiple types of devices as described in the Background of the Invention section.
Figure 3:
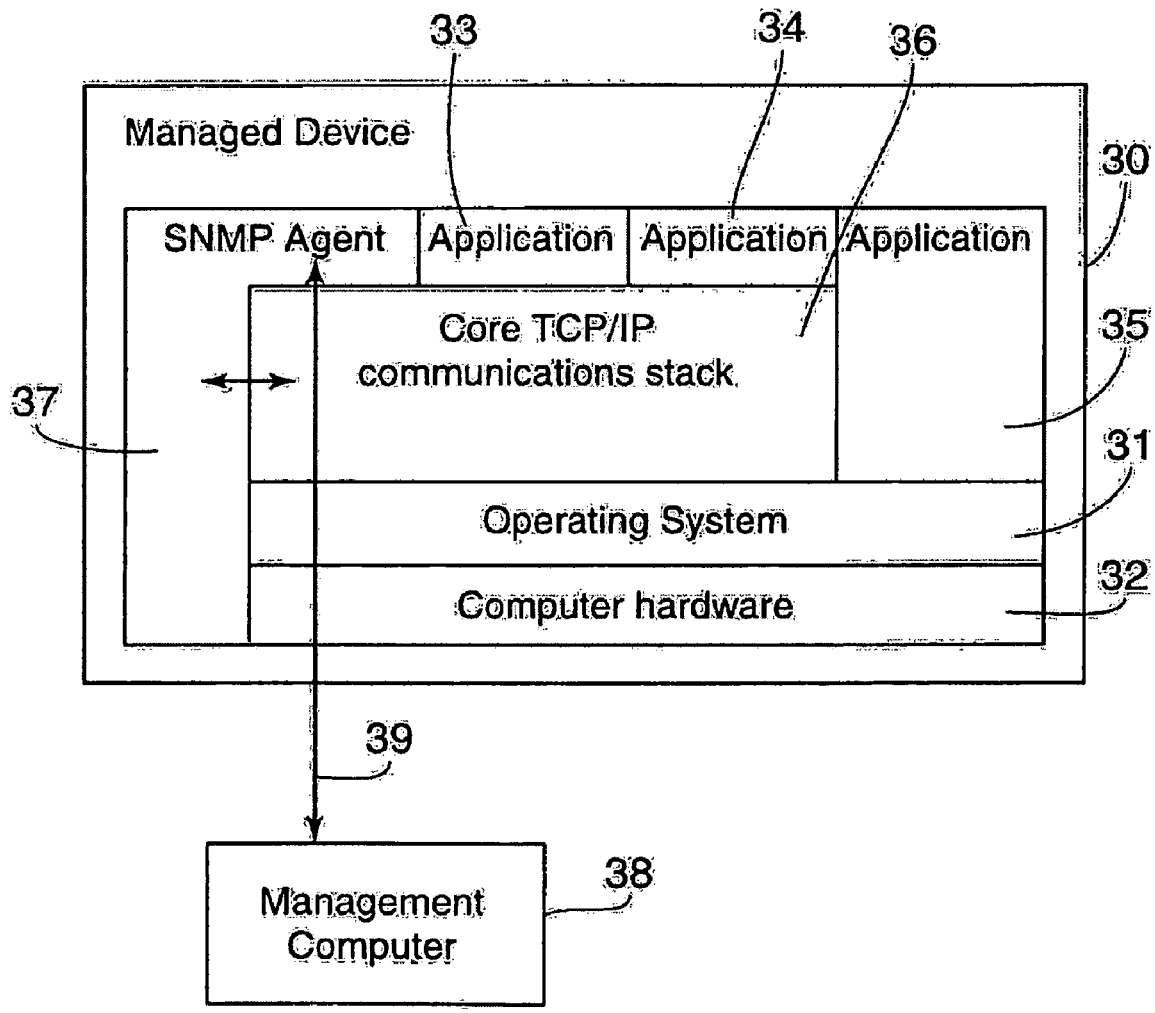
FIG. 3 is a block diagram indicating component hardware and software layers of a networked device which is in communication with a management computer via a conventional SNMP agent as described in the Background of the Invention section.
Figure 4:
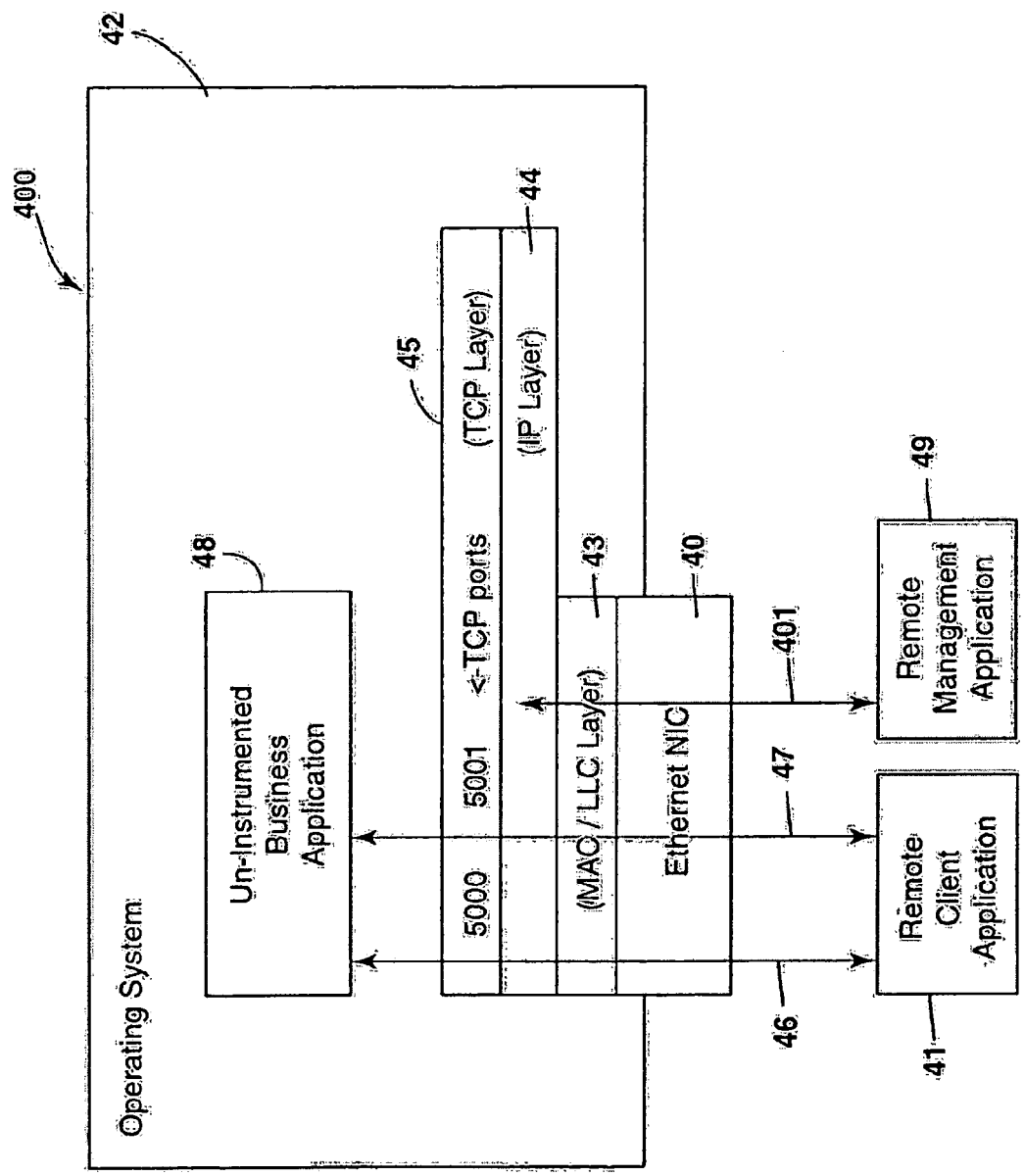
FIG. 4 is a block diagram illustrating a server with an un-instrumented network software application that is in communication with its remote client applications through TCP ports of the server, and where a remote management application has communication with the IP layer of the server.
Figure 6:
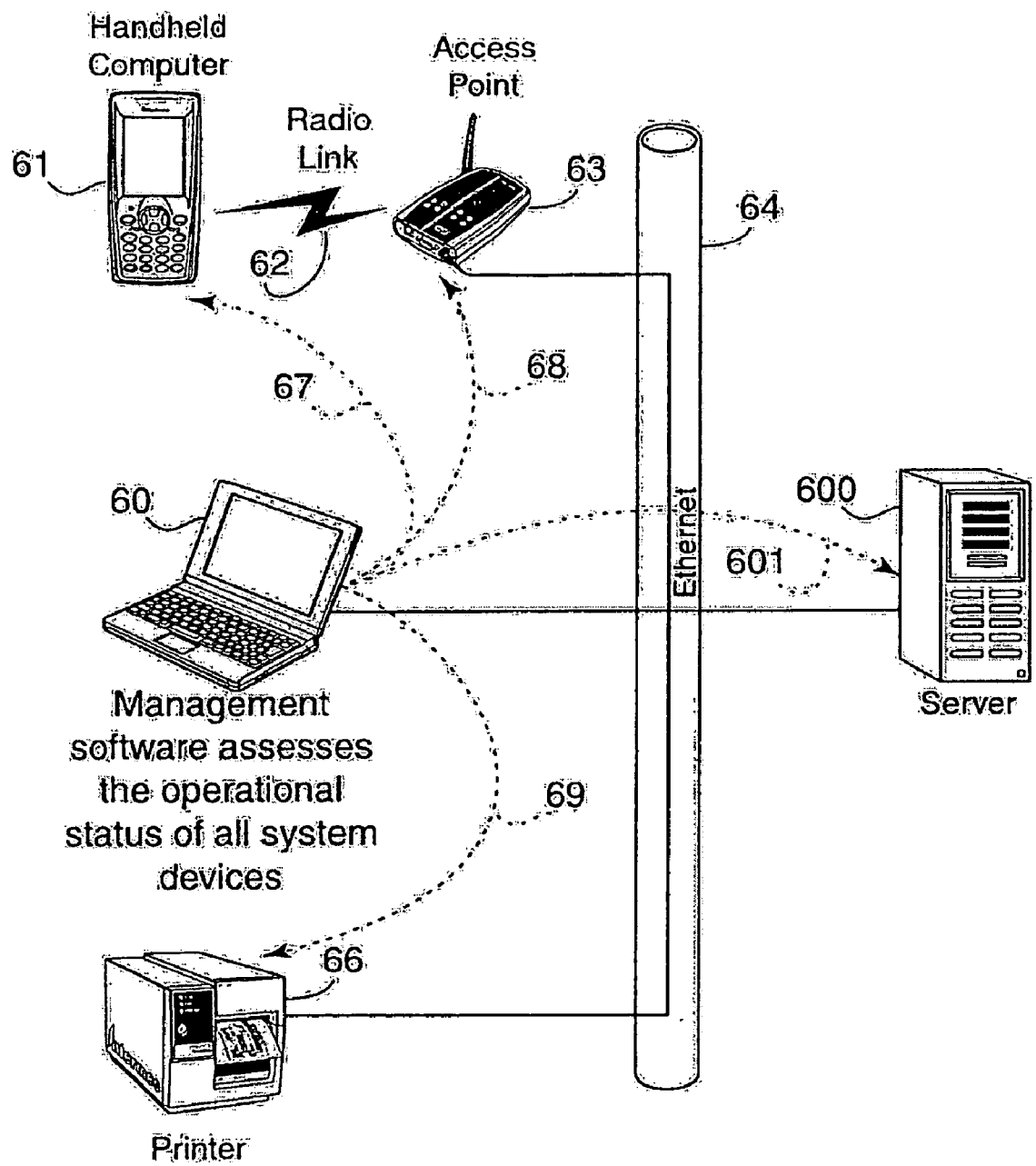
FIG. 6 is a diagrammatic illustration of a wireless automation operation of a business segment that is to facilitate the work activities of a worker by providing a handheld computer with a wireless link to a network including a server and e.g. a printer, wherein a management station is provided with software for assessing the operational status of the various devices coupled with the network.

Modification of FIGS. 4 and 6 to Monitor Server Operation

The obstacle to better system management in FIG. 4 is the remote management application's inability to determine which software applications are running and their current operational status. FIG. 4 has been modified to indicate a path 401 such that the remote management application 49 can perform a ping(1) that goes into the IP layer 44, but does not penetrate into the strata of software applications. Thus, the ping(1) test is not a positive indication that the software application 48 is executing, only that the server's IP stack 44 is alive and well. To facilitate the sophisticated management required for complex networks or novice network engineers a more capable interface is required such as described with reference to FIGS. 7, 8 and 9. In FIG. 6, a modification would check the operational status of the server 65, by sending a message such as a ping(1) as discussed above which would be sent via a communication pathway as indicated at 601 in FIG. 6 (to the IP layer 44 of server 65 as indicated by path 401 shown as a modification to FIG. 4).

Incorporation by Reference

The following patent applications are hereby incorporated herein by reference in their entirely including claims, abstract, drawings and all appendices and incorporated material:

(1) Non-provisional application of Richard J. Mahany, Ronald L. Mahany, John S. Bandringa and Joseph M. Dusio, deposited by Express Mail, Express Mail Label No. ET 885 808 261US, on Jul. 18, 2003, and entitled "Indicator for Communicating System Status Information", herein referred to as a non-provisional application of Joseph M. Dusio et al.;

(2) U.S. Provisional Patent Application No. 60/044,000 filed Apr. 16, 1997;

(3) U.S. Non-provisional patent application Ser. No. 09/061,285 filed Apr. 16, 1998, now abandoned, "Network Manager Including User Defined Trap Capability";

(4) Joseph M. Dusio U.S. Provisional Application No. 60/267,429 filed Feb. 8, 2001, entitled "Network Management Extension for Digital Radios"; and (5) Nonprovisional patent application Ser. No. 09/681,169 filed Feb. 7, 2001.

It should be understood that all of the embodiments described hereinabove are merely illustrative, and that modifications and adaptations will readily occur to those skilled in the art from a consideration of the present disclosure. Such modifications and adaptations are considered to be within the scope of the teachings and concepts of the present inventions. For example, the various teachings herein can be applied to and incorporated in the embodiments of incorporated patent applications (1), (2), (3), and (4). Communication of status and recommended trouble shooting activities and the like based on the results of monitoring of all system elements including application software, can be with the use of the teachings of incorporated patent applications (4) and (5), and can be sent directly to a novice end user of mobile terminal equipment from the management software, or can be sent with the mediation of network management personnel or user assistance personnel, who may have access both to a trouble shooting database and to the management station system monitoring information.

SUPPLEMENTARY DISCUSSION

Figure 10:
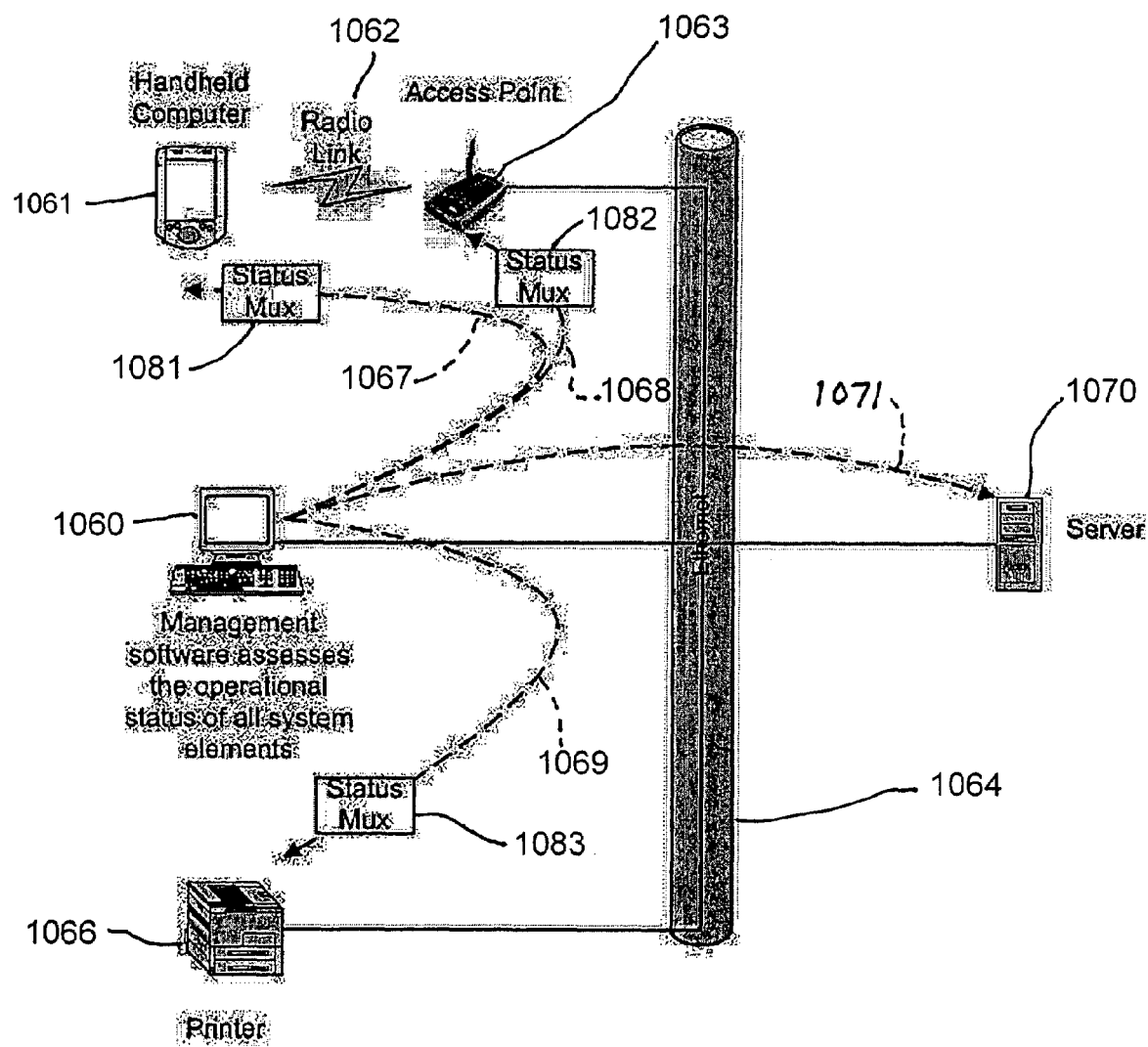
FIG. 10 is a diagrammatic illustration of a wireless automation operation of a business segment that is to facilitate the work activities of a worker by providing a mobile computer such as a handheld computer or a user worn computer system with a wireless link to a network including a server and e.g. a printer, wherein a management station is provided with software for assessing the operational status of the various hardware and software (or programming, such as application programming, in whatever form) components coupled with the network.

Description of FIG. 10

The system management of all elements approach would add a management computer as at 1060, FIG. 10, and require that the hardware and software elements be manageable and instrumented and would manage those elements e.g. the handheld computer 1061, the access point 1063 and the printer 1066 as indicated by dash lines 1067, 1068 and 1069.

The importance of monitoring the business application software e.g. as indicated at 1071, FIG. 10, is clear when the management software providing system management of all elements reports that the handheld computer 1061, access point 1063, printer 1066 and server 1070 are all alive and well, but at the same time the user of the handheld computer 1061 cannot perform the required transactions because the business application which is expected to be executing on the server 1070 is not actually executing or is in a state where it is not responding to user transactions. In either case the user of the handheld computer 1061 cannot perform business tasks with this system.

The solution is to provide a system wherein a management computer such as 1060, performs management of all the system elements that are important to a user in carrying out a given automated business operation. To accomplish this feat, the manageable elements of the system must also include the business application software itself, as indicated by dash line 1071 in FIG. 10.

The status determination for devices such as 1061, 1063, 1066, and 1070 can benefit from external readiness signals from system management applications, e.g. from management software at management computer 1060.

Most device, network and system management applications generate a plurality of states which describe the perceived status of any device. To adapt any management application to provide input to devices with a system light (such devices being described in incorporated WO 2004/010252), a signal multiplexer may be useful. The purpose of this software entity is to provide a mapping of system management signals down into the states of the system light. FIG. 10 depicts a managed system with system status being processed through a signal multiplexer and sent to the devices such as 1060, 1063 and 1065 which may be provided with system lights or other indicators (e.g. auditory or tactile or by display of legends) for processing. The signal multiplexers are depicted as boxes 1081, 1082 and 1083 labeled "Status Mux" in FIG. 10.

More generally, FIG. 10 is illustrative of an installation where a management system is coupled to many elements including hardware and software components, and is communicative with an individual user (e.g. the user of handheld computer 1061) for supplying the user with information relative to particular tasks that such user is to carry out. Such information may include status indications as to the status of the hardware and programming elements required for the particular tasks, and/or guidance in correcting or overcoming any obstacles to performing the tasks with the required system elements.

As stated in the incorporated PCT Published Application WO 2004/010252, the user can be guided through diagnostic sequences by voice, by suitable displayed instructions, or the like, for example, which take account of the information accumulated during normal operation of the status indicators during the various setup sequences previously described in incorporated WO 2004/010252. For example, a service technician can communicate successive steps in the advanced diagnostic program based on the user report of the results shown by the status indicators during the regular setup procedures as variously described in incorporated WO 2004/010252. The service technician can communicate such instructions to the user via telephone, or via cellular telephone or other voice communication system worn by the user e.g. the user of handheld computer 1061, or e.g. via the handheld computer 1061 itself, e.g. as displayed text messages.

Alternatively, the device itself e.g. 1061 or another device in the system e.g. 1060 or 1061 can provide automated instruction to a user by presenting text and or graphical information on a display thereof. Other alternatives include use of a voice instruction program reproduced under the control of the device such as 1066 exhibiting the problem, or under the control of another device, of the data handling system such as 1061 so as to be an efficient diagnosis procedure for such problem based on the events that occurred during the normal setup routine.

Many other methods of guiding the user to initiate the successive steps of an advanced or more precise diagnostic program can also be included. For example, causing a device such as 1061 or 1066 experiencing a connectivity problem to wirelessly transmit the data from the normal setup procedure to a communication device such as a cell phone (e.g. worn by the user of handheld computer 1061) or computer such as 1060, having internet access to a diagnostic computer, that in turn could send the user, as a voice or a text message for example, keypress sequences to be affected to carry out or initiate the advanced diagnostic routine.

As explained with reference to FIGS. 5 and 6, typical operational scenarios show the importance of instrumenting the business application software such as 82, FIG. 8, at servers such as indicated at 700, FIG. 7, at 800, FIG. 8, and at 1070, FIG. 10. A management computer such as 90, FIG. 9, or 1060, FIG. 10, may have communication with an instrumented software application such as 82, FIG. 8, for servers 700, 800, or 1070, which is installed on the server 900, FIG. 9, or 1070, FIG. 10. A wireless handheld computer 91, FIG. 9, or 1061, FIG. 10, may have a radio connection 92 or 1062 to an access point 93 or 1063. The access point 93 or 1063 itself may be connected directly or via a further wireless link to an Ethernet segment 94 or 1064 upon which the application server 900 or 1070 and a printer such as 56, 66, or 1066 are also connected. Many typical scenarios use this hardware configuration. A typical use of this configuration is that a scanned bar code or other piece of information is acquired or entered at the handheld computer 91 or 1061. That data is sent through the access point 93 or 1063 to the application server 900 or 1070 on which a business application is executing. The business application software processes the data and sends the results of that processing to the printer such as 1066 e.g. to print an appropriate label as described with reference to FIG. 5, or back to the handheld computer 91 or 1061, or both printer and handheld computer. The data utilization installations of FIGS. 7-10 may thus be used in the automation of shipping operations in a factory or warehouse, or for re-pricing operations in a retail store. Instead of or in addition to printing a human readable label and/or a barcode label with the use of a printer, the application software such as 82 at servers 700, 800, 900, and 1070 may be coupled with an RF tag programming system so as to enter required new information on an RF tag associated with the goods or transport means therefor. Equipment such as printers and RF tag programmers may be carried with the user of the handheld computer such as 71, 87, 91 or 1061.

The management computer 90 or 1060 is equipped to manage the hardware devices which are manageable and instrumented, namely the handheld computer 91 or 1061, the access point 93 or 1063 and the printer such as 1066. The importance of managing the business application software is clear when the management software of the management computer 90 or 1060 reports that the handheld computer 91 or 1061, access point 93 or 1063, printer such as 1066 and server hardware are all alive and well, but at the same time the user of the handheld computer 91 or 1061 cannot perform the required transactions because the business application which is expected to be executing on the server 900 or 1070 is not actually executing or is in a state where it is not responding to user transactions. In either case the user of the handheld computer 91 or 1061 cannot perform business tasks with the system.

The solution is to add a management computer as at 1060 that performs system management of essentially the entire system that is required for the user of the handheld computer 91 or 1061 to perform his work operations. That is, as represented in FIGS. 7, 8, 9 and 10, at least all the essential elements of the system are managed including the business application software itself.

FIG. 10 shows the preferred direct communication of remote management applications at 70, 80 and 90 and at management computer 1060 with the desired executing software component such as 82 at servers 700, 800, 900 and 1070. For these embodiments the management software at 70, 80, 90 and at management computer 1060, assesses the operational status of all system elements including the software application such as 82 at servers 700, 800, 900 and 1070. The management application e.g. at 1060 can now send queries and commands to the instrumented software application. The possible data exchanges between the management application and the instrumented software application are endless.

It is presently preferred that standard protocols such as SNMP or vendor specific protocols that use the standard client/server sockets programming environment be used to send management messages to the instrumented application. The definition of a standard but extensible minimum set of protocol messages would allow the management of multiple Instrumented software applications with a minimum of effort in the management application since only a single kind of request message need be sent for the various types of managed elements.

More important than the protocol used to transport messages between the instrumented application and the management computer such as 1060 is the meaning and application of those messages. The preceding Table I (at application page 20 of this Specification) enumerates some questions which the management computer at 70, 80, 90 and 1060 would pose through such a transport to the instrumented business application. The answers to these questions could be directly consumed by users of the management application such as 82 at servers 700, 800, 900 and 1070. Note that the set of questions enumerated are segmented into two classes. Firstly, "Global Questions" are questions that pertain to the entire system and its users. The second set of questions is focused on a single device or user of such single device.

THE BEST MODE OF IMPLEMENTATION

The preferred implementation of this idea includes multiple protocol exchanges between the management computer and the system components. The exchanges contain request messages issued by the management computer and response messages issued by the queried system components including the instrumented application software. The 26 queries listed in table 1 are encoded into the request messages issued by the management computer.

The diagram below depicts a typical implementation of protocol number 1. However, there is no implied restriction that a response from each device must be received by the Management computer before it proceeds to query the next system component. Indeed, each system component can only respond within the limitations of its processing ability and within the constraints of the network environment.

TABLE II

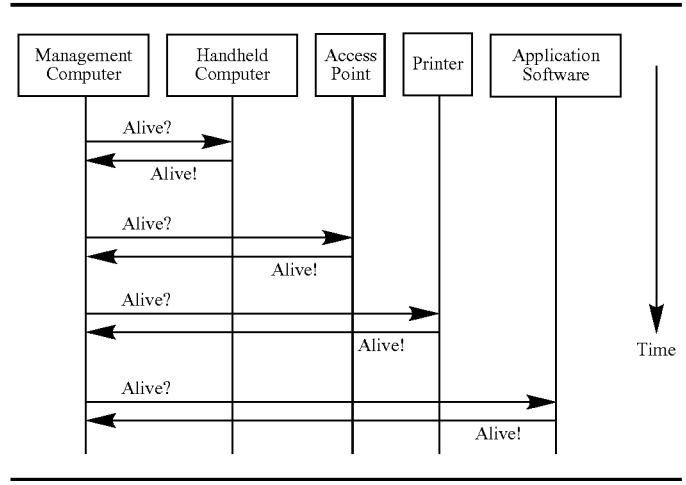

In actual practice the message exchange may resemble that depicted in the following diagram. Please note that the preferred implementation employs a mapping of each message type to a numeric value to speed the message exchanges and limit the network loading by using smaller messages compared to messages that might employ text. In this Protocol, the message "Alive?" is embodied as the Integer 1 and is only allowed in request messages as described in table 1. The response message of "Alive!" is also embodied as the Integer 1, however it is only allowed in Response messages.

In the preferred implementation all messages have an associated type. The types used in the preferred implementation contain request and response packets. All messages in the preferred implementation begin with an Integer denoting message type such as "request" and "response" and are followed by a "message number" and any additional data required by the specific "message number". The format of the additional data is specified for each unique "message number".

TABLE IV

| "Message Type" | "Message Number" | Additional data specifically required for this "message number" |
| --- | --- | --- |

TABLE II

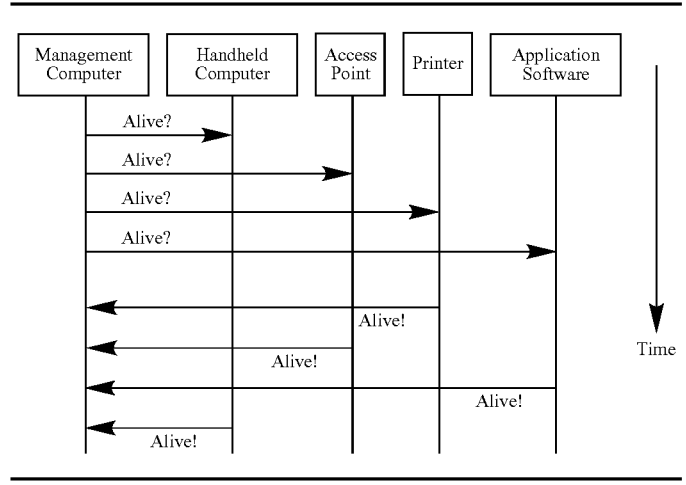

The following Table V relates the required message types

TABLE V

| Message Type Name | Message Type encoding |
|---|---|
| Request | 1 |
| Response | 2 |
| Unsolicited Notification | 3 |

The following Table VI relates the required message numbers and any additional data they would require.

TABLE VI

| Message Type | Message Content Name | Message Number Encoding | Additional data |
|---|---|---|---|
| Request | Alive? | 1 | None |
| Response | Alive! | 1 | 1 |

The remaining protocols are extremely similar in procedure but vary due to their meaning. The following Table VII summarizes their content.

TABLE VIIA

| Message number | Question |
|---|---|
| | Global Questions |
| 1 | Is the application alive? <br> Request Message = (Type = 1, Number = 1) <br> "Alive!" Response Message = (Type = 2, Number = 1, Data = 1) <br> "Dead!" Response Message = (Type = 2, Number = 1, Data = 2) <br> "Dead!" Response Message = Lack of response message in reasonable time |
| 2 | Is module "x" of the application loaded and running? <br> Request Message = (Type = 1, Number = 2, Data = (Integer)x) <br> "Module x running" Response Message = (Type = 2, Number = 2, Data = (x, 1)) <br> "Module x not running" Response Message = (Type = 2, Number = 2, Data = (x, 2)) |
| 3 | Which user accounts are currently logged on? <br> Request Message = (Type = 1, Number = 3) <br> Response Message = (Type = 2, Number = 3, Data = Comma separated variable (CSV) formatted string of account names) |
| 4 | What is the current count of application transactions? <br> Request Message = (Type = 1, Number = 4) <br> Response Message = (Type = 2, Number = 4, Data = (Integer) transaction count) |
| 5 | How many users are currently logged on? <br> Request Message = (Type = 1, Number = 5) <br> Response Message = (Type = 2, Number = 5, Data = (Integer)User Count) |
| 6 | Over the last 30 minutes, what is the average application transaction count per user? <br> Request Message = (Type = 1, Number = 6) <br> Response Message = (Type = 2, Number = 6, Data = (Integer)Average user transaction count for last 30 minutes) |
| 7 | What is the current count of failed logon attempts? <br> Request Message = (Type = 1, Number = 7) <br> Response Message = (Type = 2, Number = 7, Data = (Integer) Number of failed login attempts) |
| 8 | Which user accounts have had more than "x" logon failures in "y" days? <br> Request Message = (Type = 1, Number = 8, Data = (Integer)x, (Integer)y) <br> Response Message = (Type = 2, Number = 8, Data = CSV formatted string of user account names) |
| 9 | Which user account has the most logon failures? <br> (Answer to include account ID & count) <br> Request Message = (Type = 1, Number = 9) <br> Response Message = (Type = 2, Number = 9, Data = Account name,(Integer)login failure count) |
| 10 | What is the current count of failed application transactions? <br> Request Message = (Type = 1, Number = 10) <br> Response Message = (Type = 2, Number = 10, Data = (Integer) Count) |
| 11 | What is the current count of failed application transaction? <br> Request Message = (Type = 1, Number = 11) <br> Response Message = (Type = 2, Number = 11, Data = (Integer) Count) |
| 12 | When was the last user logon? <br> (Answer to include account ID & time) <br> Request Message = (Type = 1, Number = 12) <br> Response Message = (Type = 2, Number = 4, Data = Account name, (String)Time) |
| 13 | Who was the last user attempting to logon? <br> (Answer to include account ID, time, reason) <br> Request Message = (Type = 1, Number = 13) <br> Response Message = (Type = 2, Number = 13, Data = Account Name, (String)Time, Reason for resulting action(1 = Success, 2 = No such user, 3 = Invaid password)) |
| 14 | When was the last transaction? <br> (Answer to include account ID, time) <br> Request Message = (Type = 1, Number = 14) |
| 15 | When was the last user account terminated (logout or time-out) <br> (Answer to include account ID, time & logout/timeout) <br> Request Message = (Type = 1, Number = 15) <br> Response Message = (Type = 2, Number = 15, Data = Account name, (String) time, Reason for session termination(1 = logout, 2 = timeout, 3 = unknown)) |

TABLE VIIA-continued

| Message number | Question |
|---|---|
| 16 | When was the last user session terminated by logout?<br>(Answer to include account ID & time)<br>Request Message = (Type = 1, Number = 16)<br>Response Message = (Type = 2, Number = 16, Data = Account Name, (String)Time) |
| 17 | When was the last user session terminated by timeout?<br>(Answer to include accounted & time)<br>Request Message = (Type = 1, Number = 17)<br>Response Message = (Type = 2, Number = 17, Data = Account Name, (String)Time) |
| 18 | Is user account "x" logged on?<br>Request Message = (Type = 1, Number = 18, Data = x)<br>"User logged on" Response Message = (Type = 2, Number = 18, Data = x, 1)<br>"User not logged on" Response Message = (Type = 2, Number = 18, Data = x, 2) |
| 19 | What is the count of application transactions for user "x" during the most recent session?<br>Request Message = (Type = 1, Number = 19, Data = x)<br>Response Message = (Type = 2, Number = 19, Data = x, Count) |
| 20 | What is the count of failed logon attempts for user "x" during the most recent session?<br>Request Message = (Type = 1, Number = 20, Data = x)<br>Response Message = (Type = 2, Number = 20, Data = x, Count) |
| 21 | What is the count of failed application transactions for user "x" during the most recent session?<br>Request Message = (Type = 1, Number = 21, Data = x)<br>Response Message = (Type = 2, Number = 21, Data = x, Count) |
| 22 | What is the count of retried application transactions for user "x" during the most recent session?<br>Request Message = (Type = 1, Number = 22, Data = x)<br>Response Message = (Type = 2, Number = 22, Data = x, Count) |
| 23 | When was the last logon attempt for user "x" during the most recent session?<br>Request Message = (Type = 1, Number = 23, Data = x)<br>Response Message = (Type = 2, Number = 23, Data = x, (String)time)<br>"Never Logged in" Response Message = (Type = 2, Number = 23, Data = x, (String)0) |
| 24 | When was the last application transaction for user "x" during the most recent session?<br>Request Message = (Type = 1, Number = 24, Data = x)<br>Response Message = (Type = 2, Number = 24, Data = x, (String)time)<br>"No transactions yet" Response Message = (Type = 2, Number = 24, Data = x, (String)0) |
| 25 | Was the termination of the previous session for user "x" due to log-off or timeout?<br>Request Message = (Type = 1, Number = 25, Data = x)<br>Response Message = (Type = 2, Number = 25, Data = x, Reason(1 = logoff, 2 = timeout, 3 = Admin terminated, 4 = unknown) |
| 26 | When was the previous session terminated for user "x"?<br>Request Message = (Type = 1, Number = 26, Data = x)<br>Response Message = (Type = 2, Number = 26, Data = x, (String)Time |
| 27 | What is the state of the managed device<br>Request Message = (Type = 1, Number = 27)<br>"Ready for use" Response Message = (Type = 2, Number = 27, Data = 3)<br>"Getting ready for use" Response Message = (Type = 2, Number = 27, Data = 2)<br>"Not ready for use" Response Message = (Type = 2, Number = 27, Data = 1) |

Benefits of the Response Message Content

The addition of the message number in each of the response messages allows the management computer to process the incoming message whenever it is received. This benefits the management solution, because even under the circumstances where the management computer "times-out" on a request and believes that the system component did not respond, it can still process the message. Further, the management computer can reset its ideas about how quickly that managed system component can respond. The result is that a smart management computer will wait longer for managed system components that respond more slowly than it had expected.

The completeness of the response messages also allows the managed system components to send their responses in an unsolicited manner to the management computer. To allow the management station to discern between slow responses and unsolicited responses, the message type of "Unsolicited Notification" embodied by the Integer 3 is included in the preferred implementation.

Implementation Possibilities with SNMP

This innovation may be implemented over SNMP simply by taking the data in the responses and creating a MIB for them on the device. The request and response packets map directly to SNMP's "GET" and "RESPONSE" messages. The "Unsolicited Notification" messages may be mapped to SNMP's "Traps" or "Notifications".

Present Claim Terminology

The term "data utilization installation" is intended to cover the case where the management system of the utilization installation is at least in part located remote from the other components of the installation, and communicates via the Internet or other wide area medium, with data handling devices located locally to the user, as well as the case where the management system is e.g. at least partly in a branch management station located locally to the user, or in one of the devices to be employed by the user, including the mobile computer system that at least in part may be worn or otherwise carried by the user.

I claim as my invention:

1. In a data utilization installation,
a data handling system comprising:
a first data handling device, and
a second data handling device for use by an individual user for carrying out a task which utilizes software associated with at least one of the first data handling device and the second data handling device; and
a management system coupled to the first and second data handling devices, for monitoring the software during use of the second data handling device by the individual user and making a determination of whether the software utilized for carrying out the task is ready for use to carry out the task;
said management system generating status information based on the determination of whether the software utilized for carrying out the task is ready for use to carry out the task, for delivery to the individual user of the second data handling device.

2. In a data utilization installation according to claim 1, said management system having a communication path to the user or to the second device, for delivery of status information to the user of the second data handling device.

3. In a data utilization installation according to claim 1, said management system being part of a network including a wireless communication link to the user or to the second device, for delivery of status information to the user of the second data handling device.

4. In a data utilization installation according to claim 1, said management system being part of a network including a wireless communication link to the user or to the second device, for delivery of status information to the user of the second data handling device, said management system receiving and utilizing information concerning resources required by the user to perform assigned tasks, and the status information delivered to the user taking account of whether or not such resources are available to the user.

5. In a data utilization installation according to claim 1, said first data handling device comprising an application server communicatively coupled to the second data handling device, the first data handling device being operable to receive information from the second data handling device and to execute the software to carry out the task by employing resources of at least one of the first data handling device, the second data handling device, and other equipment communicatively coupled to the first data handling device.

6. In a data utilization installation according to claim 5, said first data handling device and said second data handling device being communicatively coupled via at least one access point device.

7. In a data utilization installation according to claim 6, said second data handling device being a wireless handheld computer having a radio connection to the at least one access point device.

8. In a data utilization installation according to claim 5, said other equipment communicatively coupled to the first data handling device comprising at least one of a printer and a radio frequency (RF) tag programming system.

9. In a data utilization installation according to claim 5, said information from the second data handling device received by the first data handling device comprising bar code information acquired or entered at the second data handling device.

10. In a data utilization installation according to claim 1, said first data handling device comprising a port for receiving requests for status information.

11. In a data utilization installation,
an application server;
a computing device operable by a user for carrying Out a task utilizing software associated with at least one of the application server and the computing device; and
a system management computer communicatively coupled to the application server and the computing device, the system management computer being operable to execute a remote management application that assesses an operational condition of the software to determine whether the software is ready for use to perform the task to be carried out by the user;
wherein the remote management application develops status indication information for the user of the computing device to communicate to the user whether the task to be carried out with the computing device is currently able to be performed or not, based on the determination of whether the software is ready for use to perform the task.

12. In a data utilization installation according to claim 11, wherein the remote management application further determines whether required resources of the data installation are available to perform the task to be carried out by the user, and the status indication information developed by the remote management application to communicate to the user whether the task to be carried out with the computing device is currently able to be performed or not is also based on the determination of the availability of the required resources to perform the task.

13. In a data utilization installation according to claim 12, wherein an identification of the required resources for performing the task to be carried out by the user is provided to the remote management application by the software associated with at least one of the application server and the computing device.

14. In a data utilization installation according to claim 11, wherein the status indication information is utilized to control a system readiness light on the computing device.

* * * * *